United States Patent
Zhu et al.

(10) Patent No.: US 11,084,760 B2
(45) Date of Patent: Aug. 10, 2021

(54) WATER CAPSULES AND THEIR PREPARATION METHOD, PREPARATION METHOD AND STRUCTURE OF LIGHTWEIGHT CONCRETE

(71) Applicant: Hip Hing Construction Technology Limited, Kowloon (HK)

(72) Inventors: Hong Gang Zhu, Kowloon (HK); Yuet Kee Lam, Kowloon (HK); Xiao Hu Zhu, Kowloon (HK); Man Lung Sham, Kowloon (HK); Tomi Pekka Bernhard Nissinen, Kowloon (HK); Jing Wen Liang, Kowloon (HK); Su Ping Bao, Kowloon (HK); Kwok Leung So, Kowloon (HK)

(73) Assignee: Hip Hing Construction Technology Limited, Kowloon (HK)

( * ) Notice: Subject to any disclaimer, the term of this patent is extended or adjusted under 35 U.S.C. 154(b) by 357 days.

(21) Appl. No.: 15/892,269

(22) Filed: Feb. 8, 2018

(65) Prior Publication Data

US 2018/0222806 A1 Aug. 9, 2018

Related U.S. Application Data

(60) Provisional application No. 62/463,531, filed on Feb. 24, 2017.

(30) Foreign Application Priority Data

Feb. 8, 2017 (CN) .......................... 201710079925.3

(51) Int. Cl.
| | | |
|---|---|---|
| *C04B 40/02* | (2006.01) |
| *B01J 13/12* | (2006.01) |
| *C04B 22/00* | (2006.01) |
| *C04B 24/26* | (2006.01) |
| *C04B 24/38* | (2006.01) |
| *B01J 13/04* | (2006.01) |
| *C04B 28/02* | (2006.01) |
| *C04B 38/00* | (2006.01) |
| *C04B 20/10* | (2006.01) |
| *C04B 103/00* | (2006.01) |
| *C04B 111/40* | (2006.01) |
| *C04B 103/42* | (2006.01) |

(52) U.S. Cl.
CPC ......... *C04B 40/0295* (2013.01); *B01J 13/043* (2013.01); *B01J 13/046* (2013.01); *B01J 13/125* (2013.01); *C04B 20/1033* (2013.01); *C04B 20/1055* (2013.01); *C04B 22/002* (2013.01); *C04B 24/2641* (2013.01); *C04B 24/38* (2013.01); *C04B 28/02* (2013.01); *C04B 38/009* (2013.01); *C04B 2103/005* (2013.01); *C04B 2103/42* (2013.01); *C04B 2111/40* (2013.01)

(58) Field of Classification Search
CPC ...... B01J 13/043; B01J 13/046; B01J 13/125; B01J 13/02; C04B 20/1033; C04B 20/1055; C04B 22/002; C04B 24/2641; C04B 24/38; C04B 28/02; C04B 38/009; C04B 40/0295; C04B 2103/005; C04B 2103/42; C04B 2111/40; C04B 38/00; C04B 2201/20
See application file for complete search history.

(56) References Cited

U.S. PATENT DOCUMENTS

| | | | | |
|---|---|---|---|---|
| 4,096,944 A | * | 6/1978 | Simpson | ............. C04B 40/0666 106/784 |
| 4,487,529 A | * | 12/1984 | Douty | ................... E21D 20/021 106/713 |
| 5,146,047 A | * | 9/1992 | Nagata | .................. C04B 22/002 174/388 |
| 8,974,594 B2 | * | 3/2015 | Miller | ..................... C04B 28/02 106/713 |

FOREIGN PATENT DOCUMENTS

JP 01-171634 * 7/1989

* cited by examiner

*Primary Examiner* — Irina S Zemel
(74) *Attorney, Agent, or Firm* — Intellectual Property Law Group LLP

(57) ABSTRACT

The present application provides for water capsules, preparation methods of water capsules, a preparation method for lightweight concrete and a structure of lightweight concrete. Each of the water capsules comprises an alkali-sensitive shell and water inside; the water capsules are used to mix with a cementitious matrix, the water capsules can survive during concrete mixing and transportation processes but then gradually rupture in hardened concrete; the water released during the hardening of the concrete is beneficial for the hydration of the concrete. The water capsules and their preparation method, the preparation method for and structure of the lightweight concrete of the present application are of unique design and strong practicability.

2 Claims, 3 Drawing Sheets

Normal concrete            Cellular concrete with capsules

WATER CAPSULES AND THEIR PREPARATION METHOD, PREPARATION METHOD AND STRUCTURE OF LIGHTWEIGHT CONCRETE

CROSS-REFERENCE TO RELATED APPLICATIONS

This application claims priority Chinese patent application no. 201710079925.3, filed on Feb. 8, 2017 and U.S. Provisional Patent Application No. 62/463,531, filed on Feb. 24, 2017, and entitled "Water Capsule Technology for Super Strong Lightweight Concrete," the disclosures of which are hereby incorporated herein by reference in their entireties.

BACKGROUND

1. Field of Invention

The present application relates to the field of the materials, and more particularly to water capsules and their preparation method, the preparation method and structure of the lightweight concrete.

2. Background

In the conventional foamed concrete technology, the pre-formed foam is easily ruptured by over mixing during the transportation from concrete plant to construction site, which adversely affects the density and strength of final foamed concrete.

SUMMARY

Addressing the above problems, the present invention provides water capsules and their preparation methods, a preparation method and structure of a lightweight concrete.

The technical solution of the present application is described in the following exemplary embodiments.

According to an aspect of an exemplary embodiment of the present invention, there is provided water capsules comprising an alkali-sensitive shell and water inside; water capsules are mixed with cementitious matrix, which can survive during concrete mixing and transportation processes but then gradually rupture in hardened concrete; the water released after final set is beneficial for the hydration of the concrete.

In the above water capsules of the present application, the shell is made of alkali-sensitive materials.

In the above water capsules of the present application, the alkali-sensitive materials swell or dissolve under alkaline conditions.

In above water capsules of the present application, the alkali swollen materials are selected from polymers, such as polyacrylate and poly(styrene-acrylate).

In the above water capsules of the present application, the alkali dissolvable materials are selected from inorganics or polymers, such as silica, alginate, water soluble phenolic resin and methacrylic acid-methyl methacrylate copolymer.

In the above water capsules of the present application, the size of water capsule is in the range of 10 μm to 400 μm.

Embodiments of the present invention provide different preparation methods for the above water capsules, such as single emulsion solvent evaporation technique, double emulsion solvent evaporation technique, spray drying method followed by water loading and co-extrusion microfluidic approach.

In the above preparation methods for water capsules of the present application, the single emulsion solvent evaporation technique comprises the following steps: dissolving polymers in a mixture of water and an organic solvent to form an internal oil phase; emulsifying the internal oil phase in a non-miscible external oil phase to form a stable emulsion; evaporating the organic solvent from the emulsion to form the water capsules; washing and collecting the capsules.

In the above single emulsion solvent evaporation technique, the polymer is methacrylic acid-methyl methacrylate copolymer; the organic solvent is methanol.

In the above single emulsion solvent evaporation technique, the weight ratio of the polymer to the mixture of water and methanol is from 1% to 7%; the volume ratio of methanol to water is 95:5.

In the above single emulsion solvent evaporation technique, the external oil phase is made of liquid paraffin and contains a stabilizer.

In the above single emulsion solvent evaporation technique, the volume ratio of the internal oil phase to the external oil phase is 1:4-5.

In the above preparation methods for water capsules of the present application, a double emulsion solvent evaporation technique comprises the following steps: emulsifying water, referred to as inner water phase, in a polymeric organic solution, referred to as a middle oil phase, to form primary emulsion; emulsifying primary emulsion in water, referred to as an outer water phase, to form double emulsion; evaporating the organic solvent from double emulsion to form the water capsules; washing and collecting the capsules.

In the above double emulsion solvent evaporation technique, the polymeric organic solution is prepared by dissolving polyacrylate in dichloromethane; the weight ratio of polyacrylate to dichloromethane is from 1% to 10%.

In the above double emulsion solvent evaporation technique, inner and outer water phases contain a stabilizer.

In the above double emulsion solvent evaporation technique, the volume ratio of inner water phase to middle oil phase in primary emulsion is 1:3-5; the volume ratio of primary emulsion to outer water phase in double emulsion is 1:3-5.

In the above preparation methods for water capsules of the present application, a spray drying method followed by water loading comprises the following steps: dispersing or dissolving materials in water to form a stable suspension or solution; producing hollow spheres by spray drying the suspension or solution; placing hollow spheres at reduced pressure and loading water into them at atmospheric pressure; collecting the capsules.

In the above spray drying method followed by water loading, the suspension comprises of silica colloid (<200 nm), or poly(styrene-acrylate) latex (<200 nm); the solution comprises of alginate or water soluble phenolic resin.

In the above spray drying method followed by water loading, the suspension or solution contains foaming agents to enlarge hollow spheres.

In the above preparation methods for water capsules of the present application, a co-extrusion microfluidic approach comprises the following steps: pumping water, referred to as an inner fluid, and polymer solution, referred to as an outer fluid, simultaneously to form droplets with water core and pre-gelated shell; dripping droplets into gelling solution one by one to form water core-gelated shell capsules; collecting the capsules.

In the above co-extrusion microfluidic approach, the polymer solution comprises of alginate; the gelling solution is calcium chloride solution.

In an embodiment of the present invention, there is a preparation method for a lightweight concrete, comprising the following steps: mixing the above water capsules with cementitious matrix; casting concrete; the water capsule shell is gradually destroyed during the hardening of the concrete, and the water inside is released and causes the formation of air voids, resulting in the lightweight concrete.

According to another aspect, the present invention provides a lightweight concrete structure, formed by the above lightweight concrete.

In embodiments of the present invention, water capsules are incorporated into the concrete; the water capsule shell can protect them from being ruptured during over mixing; within a certain period after casting, the shell of the water capsules is gradually destroyed in the alkaline environment, the water in the capsules is released, and the air voids are formed. In the present application, as the water capsules in the concrete are destroyed after final set, which means the air voids in the concrete are formed after final set as well, the rupture of pre-formed foam of conventional foamed concrete caused by over mixing during the transportation process is avoided. The water capsules and their preparation method, the preparation method and structure of the lightweight concrete of the present application are of unique design and strong practicability.

BRIEF DESCRIPTION OF THE DRAWINGS

The present exemplary embodiments will be further described below with reference to the accompanying drawings in which.

DETAILED DESCRIPTION OF SPECIFIC EMBODIMENTS

Figure 1:
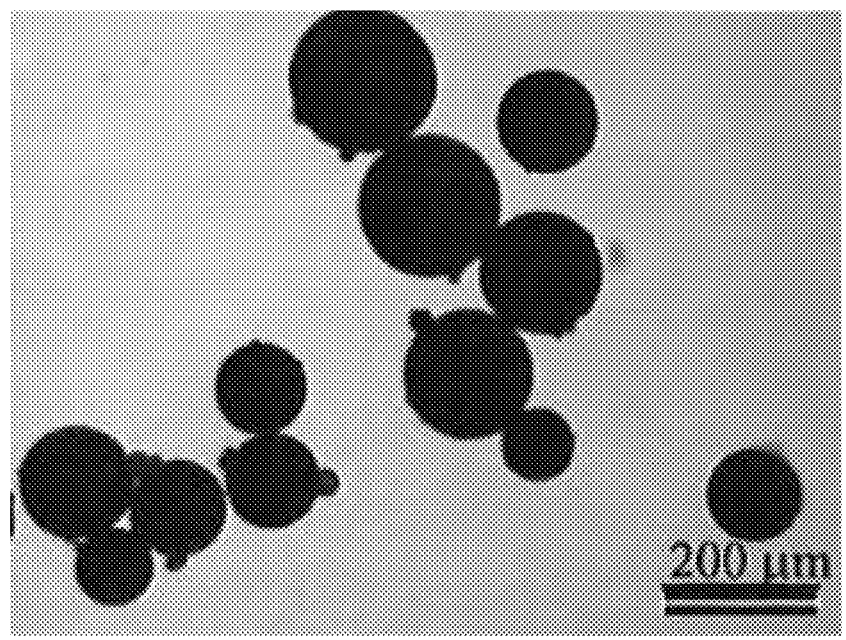
FIG. 1 is an optical micrograph of the water capsules prepared according to a first embodiment of the present application.

The technical problem to be solved by the exemplary embodiments of the present invention is how to reduce the risk that the pre-formed foam in foamed concrete ruptures due to excessive mixing during transportation. The technical idea of the application proposed to solve the technical problem is: the water capsules are incorporated into the concrete; the water capsule shell can protect the water capsule from being ruptured during mixing and transportation; within a certain period after casting, the shell of the water capsules is gradually destroyed in the alkaline environment, the inside water is released, and the air voids are formed. In the present application, as the water capsules in the concrete will be ruptured after final set, which means the air voids in the concrete are formed some time after the final set, the rupture of pre-formed foam of conventional foamed concrete caused by the over mixing during the transportation process is avoided.

Specifically, the present application provides water capsules comprising an alkali-sensitive shell and water inside; water capsules are used to incorporate into concrete and can survive during mixing and transportation; after the final set of concrete, the shell of the water capsules is gradually destroyed in the alkaline environment, and the water in the capsules is released. The size of water capsule is in the range of 10 μm to 400 μm. Here, the mixing and transportation time of water capsules is generally 30 min-36 h.

Specifically, in the present application, the shell is made of alkali-sensitive materials, which can swell or dissolve under alkaline conditions.

Further, the alkali swollen materials are polymers, such as polyacrylate and poly(styrene-acrylate), and the alkali dissolvable materials are inorganics or polymers, such as silica, alginate, water soluble phenolic resin and methacrylic acid-methyl methacrylate copolymer.

Further, the present application provides different preparation methods for the above water capsules, such as single emulsion solvent evaporation technique, double emulsion solvent evaporation technique, spray drying method followed by water loading, and co-extrusion microfluidic approach.

The single emulsion solvent evaporation technique according to an embodiment of the present invention comprises the following steps: dissolving polymers in a mixture of water and an organic solvent to form an internal oil phase; emulsifying the internal oil phase in a non-miscible external oil phase to form a stable emulsion; evaporating the organic solvent from the emulsion to form the water capsules; washing and collecting the capsules.

In the single emulsion solvent evaporation technique, the polymer is methacrylic acid-methyl methacrylate copolymer; the organic solvent is methanol. In the single emulsion solvent evaporation technique, the weight ratio of the polymer to the mixture of water and methanol is from 1% to 7%; the volume ratio of methanol to water is 95:5. In the single emulsion solvent evaporation technique, the external oil phase is made of liquid paraffin and contains a stabilizer. In the single emulsion solvent evaporation technique, the volume ratio of the internal oil phase to the external oil phase is 1:4-5.

The double emulsion solvent evaporation technique according to an embodiment of the present invention comprises the following steps: emulsifying water, referred to as an inner water phase, in a polymeric organic solution, referred to as a middle oil phase, to form a primary emulsion; emulsifying the primary emulsion in water, referred to as an outer water phase, to form a double emulsion; evaporating the organic solvent from the double emulsion to form the water capsules; washing and collecting the capsules.

In the double emulsion solvent evaporation technique, the polymeric organic solution is prepared by dissolving polyacrylate in dichloromethane; the weight ratio of polyacrylate to dichloromethane is from 1% to 10%. In the double emulsion solvent evaporation technique, the inner and outer water phases contain a stabilizer. In the double emulsion solvent evaporation technique, the volume ratio of inner water phase to middle oil phase in primary emulsion is 1:3-5; the volume ratio of primary emulsion to outer water phase in double emulsion is 1:3-5.

The spray drying method followed by water loading according to an embodiment of the present invention comprises the following steps: dispersing or dissolving materials in water to form a stable suspension or solution; producing hollow spheres by spray drying the suspension or solution; placing hollow spheres at reduced pressure and loading water into them at atmospheric pressure; collecting the capsules.

In the spray drying method followed by water loading, the suspension comprises of silica colloid (<200 nm), or poly (styrene-acrylate) latex (<200 nm); the solution comprises of alginate or water soluble phenolic resin. In the spray drying method followed by water loading, the suspension or solution contains foaming agents to enlarge the hollow spheres.

The co-extrusion microfluidic approach according to an embodiment of the present invention comprises the following steps: pumping water, referred to as an inner fluid, and a polymer solution, referred to as an outer fluid, simultaneously to form droplets with a water core and pre-gelated shell; dripping the droplets into a gelling solution one by one to form water core-gelated shell capsules; collecting the capsules. In the co-extrusion microfluidic approach, the polymer solution comprises of alginate; the gelling solution is calcium chloride solution.

Further, the present application provides a preparation method for a lightweight concrete, according to an embodiment of the present invention comprising the following steps: mixing the above water capsules with a cementitious matrix; casting concrete; the water capsule shell is gradually destroyed during the hardening of the concrete, and the water inside is released and causes the formation of air voids, resulting in the lightweight concrete.

The present application provides a lightweight concrete structure, formed by the above lightweight concrete according to an embodiment of the present invention.

In order to illustrate the technology, the technical scheme and technology performance of the application more clearly, and facilitate the understanding and implementation of people in the art, the application will now be described in further detail with reference to the accompanying drawings and specific examples.

First Embodiment

In this embodiment, capsules are prepared by a single emulsion solvent evaporation technique. Methacrylic acid-methyl methacrylate copolymer is dissolved into a mixture of water and methanol to form the internal oil phase. Wherein, the weight ratio of polymer to the mixture of water and methanol is 7%; the volume ratio of methanol to water is 95:5. The internal oil phase is uniformly dispersed in the liquid paraffin to form the stable emulsion. Wherein, the weight ratio of stabilizer to liquid paraffin is 1%. Water capsules are formed by evaporating the organic solvent from the emulsion. Here, the stirring speed is 600 rpm and the stirring temperature is 45° C.

An optical micrograph of water capsules is obtained by microscopy, as shown in FIG. 1.

Second Embodiment

In this embodiment, capsules are prepared by a double emulsion solvent evaporation technique. Water, referred to as an inner water phase, is emulsified into a polymeric organic solution, referred to as a middle oil phase, to form a primary emulsion using a high performance disperser. Wherein, the weight ratio of a stabilizer to the inner water phase is 0.1%; the polymeric organic solution is a polyacrylate-contained dichloromethane solution and the weight ratio of polyacrylate to dichloromethane is 5%; the volume ratio of the inner water phase to the middle oil phase is 1:5. The primary emulsion is emulsified into water, referred to as an outer water phase, to form a double emulsion. Wherein, the weight ratio of the stabilizer to the outer water phase is 0.5%; the volume ratio of the primary emulsion to the outer water phase is 1:4. Water capsules are formed by evaporating the organic solvent from the double emulsion. Here, the stirring speed is 250 rpm and the stirring temperature is 35° C.

Figure 2:
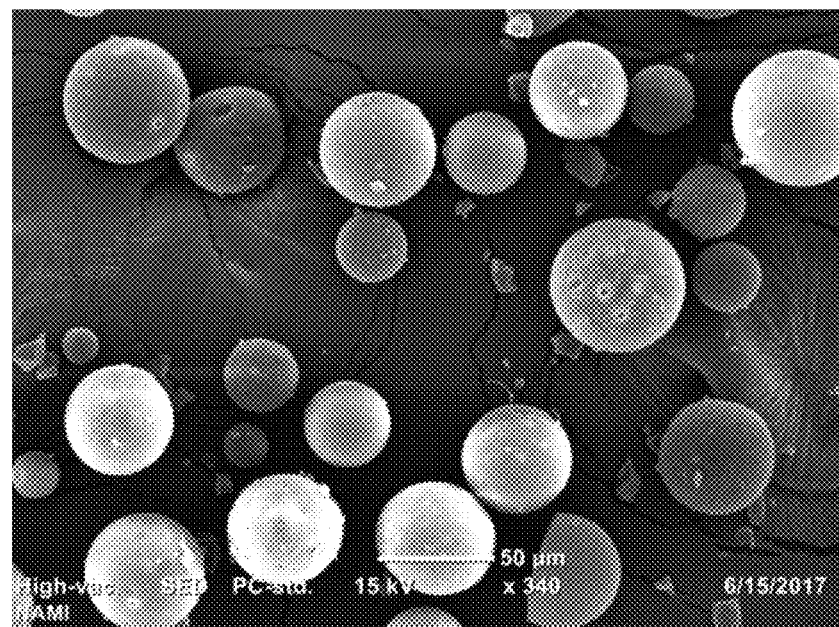
FIG. 2 is an electron micrograph of the water capsules prepared according to a second embodiment of the present application.

An electron micrograph of water capsules is obtained by scanning electron microscopy, as shown in FIG. 2.

Third Embodiment

In this embodiment, capsules are prepared by a spray drying method followed by water loading. A suspension of silica colloid (20 nm) is spray dried to produce hollow silica spheres. Wherein, the weight ratio of silica to water is 5%; the inlet temperature of the spray drying process is 110° C.; the outlet temperature of the spray drying process is 75° C. Hollow spheres are placed at a reduced pressure to remove inner air. Water is loaded into the hollow spheres by mixing treated hollow spheres in water to let the water penetrate into them.

Figure 3:
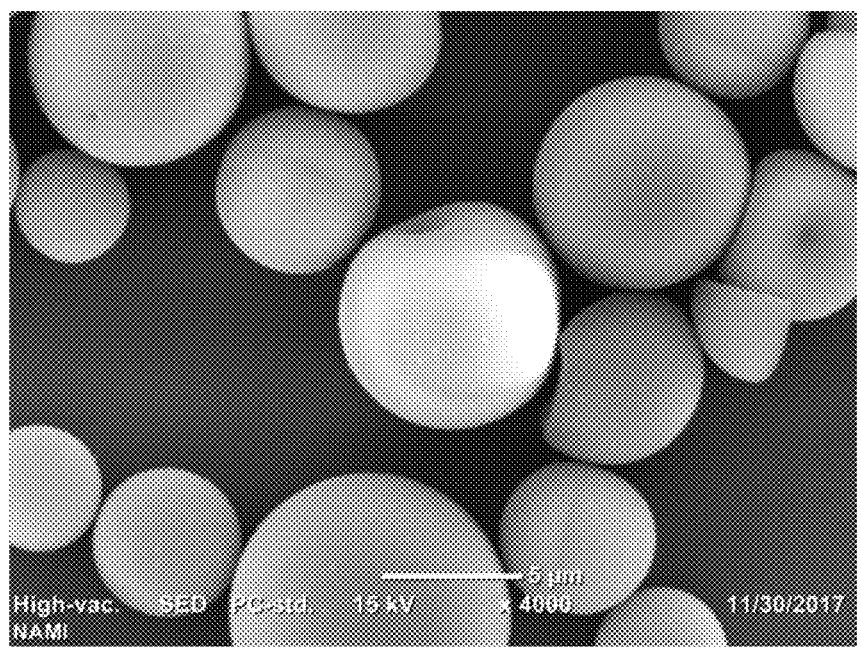
FIG. 3 is an electron micrograph of the water capsules prepared according to a third embodiment of the present application.

An electron micrograph of water capsules is obtained by scanning electron microscopy, as shown in FIG. 3.

Fourth Embodiment

In this embodiment, capsules are prepared by a co-extrusion microfluidic approach. Water, referred to as an inner fluid, and a polymer solution, referred to as an outer fluid, are simultaneously pumped into nozzles to form droplets with a water core and a pre-gelated shell. Wherein, the polymer solution is an alginate solution; the weight ratio of alginate to water is 2%. Droplets are dripped into a gelling solution one by one to form water core-gelated shell capsules. Wherein, the gelling solution is a calcium chloride solution; the weight ratio of calcium chloride to water is 2.5%.

Figure 4:
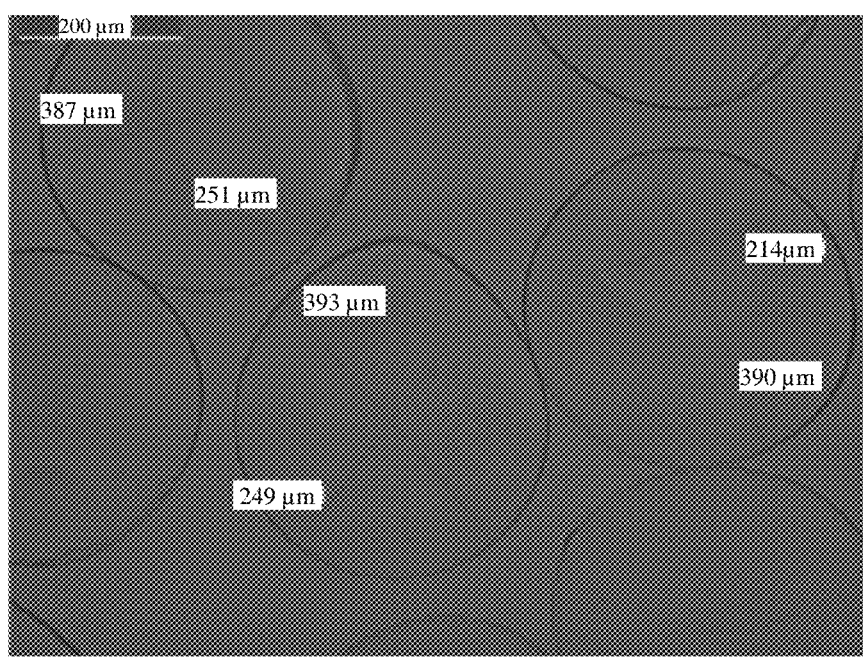
FIG. 4 is an optical micrograph of the water capsules prepared according to a fourth embodiment of the present application.

An optical micrograph of water capsules is obtained by microscopy, as shown in FIG. 4.

Fifth Embodiment

Figure 5:
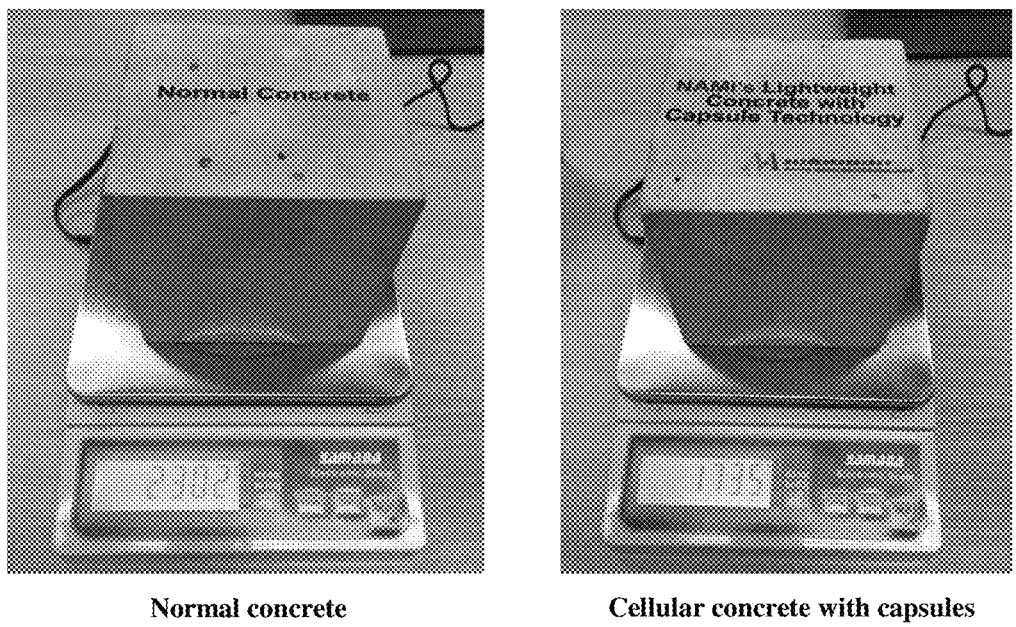
FIG. 5 shows a photo of a normal concrete block and a lightweight concrete block according to a fifth embodiment of the present application.

Water capsules of the second embodiment are used to prepare lightweight concrete. Normal concrete is prepared for comparison as well. Normal concrete is composed of 600 kg/m$^3$ cementitious and supplementary cementitious materials, 1504 kg/m$^3$ sand and aggregates, 180 kg/m$^3$ water and 6 kg/m$^3$ water reducing agent. Lightweight concrete is composed of 350 kg/m$^3$ cementitious and supplementary cementitious materials, 873 kg/m$^3$ sand and aggregates, 168 kg/m$^3$ water, 3.5 kg/m$^3$ water reducing agent, 3.5 kg/m$^3$ viscosity modifying agent and 380 kg/m$^3$ capsules. A mass comparison of one normal concrete block (100 mm×100 mm×100 mm cube) and one lightweight concrete block is shown in FIG. 5. The density of normal concrete is measured to be 2302 kg/m$^3$. The density of lightweight concrete, containing 35% capsules in volume, is measured to be 1735 kg/m$^3$.

Figure 6:
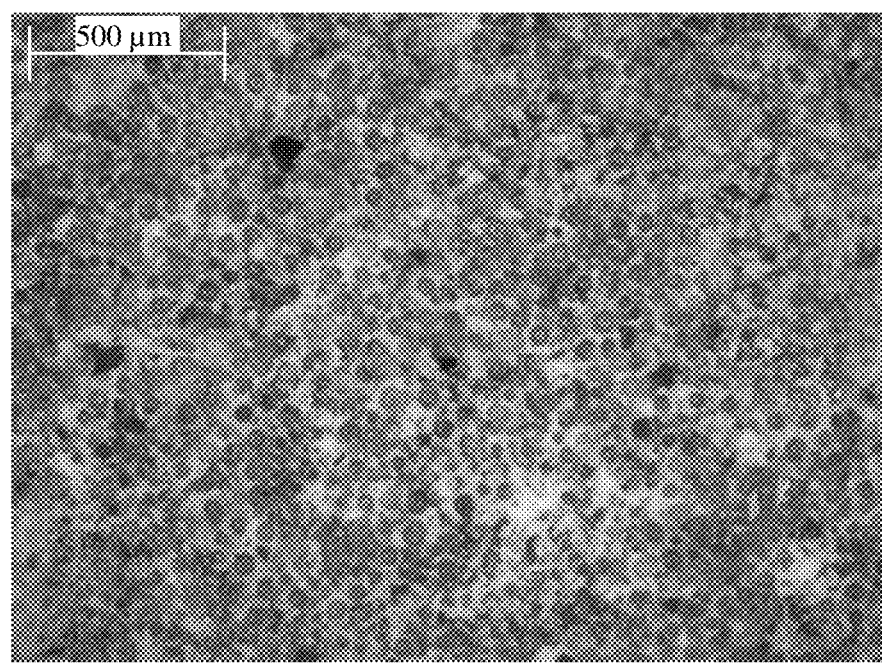
FIG. 6 is an optical micrograph of fractured surface of a lightweight concrete block according to a fifth embodiment of the present application.

A microscopic observation of fractured surface of lightweight concrete is performed as shown in FIG. 6.

It can be seen that the use of water capsules can effectively form air voids within the concrete, resulting in lightweight concrete. The air voids in the lightweight concrete of the present application are formed after the final set of the concrete, thus avoiding the destruction of the pre-formed foam in the conventional foamed concrete due to over mixing.

It is to be understood that modifications and alterations may be made by one of ordinary skill in the art in accordance with the above description and that all such modifications and alterations are intended to be within the scope of the appended claims.

The invention claimed is:

1. A preparation method for a lightweight concrete, comprising the steps of:
   mixing a plurality of water capsules with a cementitious matrix, each water capsule of the plurality of water capsules comprising an alkali-sensitive shell and water inside, the water capsules survivable so as not to rupture during concrete mixing and transportation processes;
   casting the concrete;
   hardening the concrete,
   wherein the shell of each water capsule gradually destroyed during the hardening of the concrete, and the water inside released, causing a formation of air voids, resulting in the lightweight concrete.

2. A lightweight concrete structure, formed by the lightweight concrete prepared according to claim 1;
   wherein each water capsule of the plurality of water capsules comprising:
   an alkali-sensitive shell and water inside the shell;
   wherein the shell is made of alkali-sensitive materials, the alkali-sensitive materials are alkali swollen or alkali dissolvable under alkaline conditions;
   whereby the alkali swollen materials are selected from polymers.

* * * * *